US012604101B2

(12) United States Patent
Nagayoshi et al.

(10) Patent No.: US 12,604,101 B2
(45) Date of Patent: Apr. 14, 2026

(54) SEMICONDUCTOR DEVICE AND IMAGE PROCESSING SYSTEM

(71) Applicant: Renesas Electronics Corporation, Tokyo (JP)

(72) Inventors: Isao Nagayoshi, Tokyo (JP); Kazuaki Terashima, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 87 days.

(21) Appl. No.: 18/623,841

(22) Filed: Apr. 1, 2024

(65) Prior Publication Data

US 2024/0348939 A1 Oct. 17, 2024

(30) Foreign Application Priority Data

Apr. 12, 2023 (JP) ................................. 2023-065148

(51) Int. Cl.
*H04N 23/80* (2023.01)
*H04N 23/84* (2023.01)

(52) U.S. Cl.
CPC ........... *H04N 23/80* (2023.01); *H04N 23/843* (2023.01)

(58) Field of Classification Search
CPC .... H04N 23/80; H04N 23/843; H04N 23/665; H04N 25/70; H04N 23/84
See application file for complete search history.

(56) References Cited

U.S. PATENT DOCUMENTS

| | | | |
|---|---|---|---|
| 8,229,271 B2 | 7/2012 | Inoue et al. | |
| 10,282,805 B2 * | 5/2019 | Baek | G06F 13/4265 |
| 12,238,402 B2 * | 2/2025 | Jeon | G06F 13/4282 |
| 2004/0263650 A1 * | 12/2004 | Park | H04N 23/843 |
| | | | 348/308 |
| 2022/0094818 A1 * | 3/2022 | Moriya | G06T 1/20 |
| 2024/0163571 A1 * | 5/2024 | Han | H04N 21/21805 |

FOREIGN PATENT DOCUMENTS

JP 2010-86401 A 4/2010

\* cited by examiner

*Primary Examiner* — Hung H Lam
(74) *Attorney, Agent, or Firm* — Rimon P.C.

(57) ABSTRACT

A semiconductor device or image processing system includes n interface circuit and a channel composite circuit. The interface circuit outputs a first packet including the line data of the k-th line included in the image data of the first channel, and then outputs a second packet including the line data of the k-th line included in the image data of the second channel. The channel combination circuit writes, to the memory, the line data of the k-th line included in the image data of the first channel to the first address area, and then writes the line data of the k-th line included in the image data of the second channel to the second address area that is consecutive to the first address area.

15 Claims, 15 Drawing Sheets

| | EFFICIENCY OF CIRCUIT | BAND WIDTH | STANBY POWER | REDUCTION EFFECT OF MEMORY CAPACITY |
|---|---|---|---|---|
| COMPARATIVE EXAMPLE | 1 | 1 | 1 | 0 |
| FIRST EMBODIMENT | M | i+a' | 1/M | AVERAGE : 16×M[byte]<br>MAX : 31×M[byte]<br>※BUS WIDTH 32 byte |

*FIG. 8*

MADR = STRD × LCUNT + SADR + WCUNT

*FIG. 10*

SADR_DT2

| | | IMG1 | IMG2 | IMG3 |
|---|---|---|---|---|
| SADR | L[0] | 0 | W1 | W1+W2 |
| | L[1] | W3 | W3+W1 | 0 |
| | L[2] | 0 | W1+W3 | W1 |
| | L[3] | W2+W3 | 0 | W2 |
| | L[4] | W3 | W3+W1 | 0 |
| | L[5] | 0 | – | W1 |
| | L[6] | 0 | – | – |
| | L[7] | 0 | – | – |

OADR_DT

|      | IMG1 | IMG2 | IMG3 |
|------|------|------|------|
| OADR | W1   | W2   | W3   |

FIG. 12

| | EFFICIENCY OF CIRCUIT | BAND WIDTH | STANBY POWER | REDUCTION EFFECT OF MEMORY CAPACITY |
|---|---|---|---|---|
| COMPARATIVE EXAMPLE | 1 | 1 | 1 | 0 |
| SECOND EMBODIMENT | M | $1+a''$ ($a''>a'$) | $1/M$ | AVERAGE：$16 \times M$[byte] MAX：$31 \times M$[byte] ※BUS WIDTH 32 byte |

*FIG. 13*

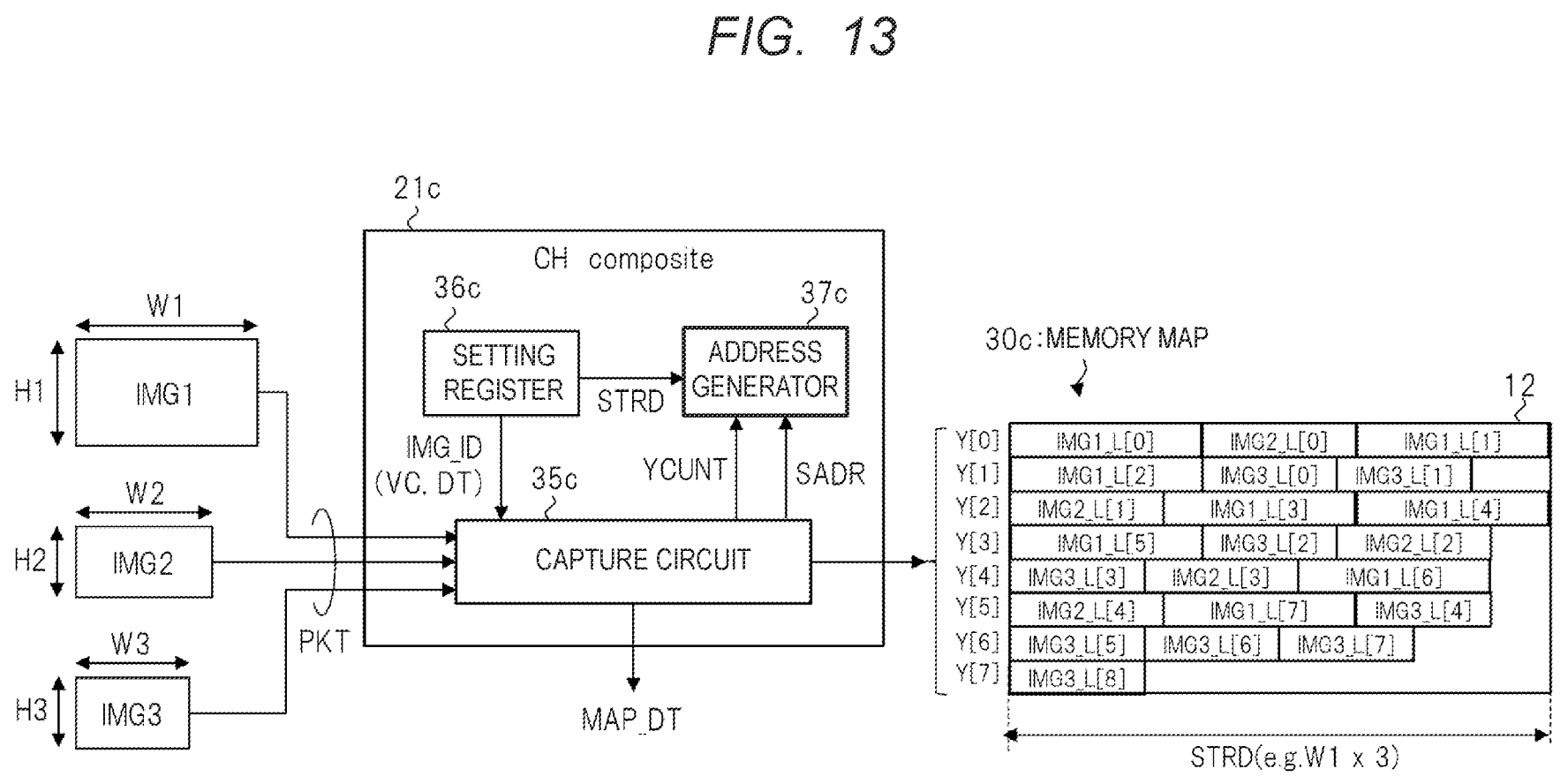

30c:MEMORY MAP

| | | | |
|---|---|---|---|
| Y[0] | IMG1_L[0] | IMG2_L[0] | IMG1_L[1] |
| Y[1] | IMG1_L[2] | IMG3_L[0] | IMG3_L[1] |
| Y[2] | IMG2_L[1] | IMG1_L[3] | IMG1_L[4] |
| Y[3] | IMG1_L[5] | IMG3_L[2] | IMG2_L[2] |
| Y[4] | IMG3_L[3] | IMG2_L[2] | IMG1_L[6] |
| Y[5] | IMG2_L[4] | IMG1_L[7] | IMG3_L[4] |
| Y[6] | IMG3_L[5] | IMG3_L[6] | |
| Y[7] | IMG3_L[8] | IMG3_L[7] | |

STRD(e.g.W1 x 3)

CH composite

21c

36c SETTING REGISTER

37c ADDRESS GENERATOR

35c CAPTURE CIRCUIT

STRD

SADR

YCUNT

IMG_ID (VC, DT)

MAP_DT

PKT

IMG1    W1    H1

IMG2    W2    H2

IMG3    W3    H3

MAP_DT

|  | IMG1 | IMG2 | IMG3 |
|---|---|---|---|
| L[0] | (Y[0],0) | (Y[0], W1) | (Y[1], W1) |
| L[1] | (Y[0],W1+W2) | (Y[2], 0) | (Y[1], W1+W3) |
| L[2] | (Y[1], 0) | (Y[3], W1+W3) | (Y[3], W1) |
| L[3] | (Y[2], W2) | (Y[4], W3) | (Y[4], 0) |
| L[4] | (Y[2], W2+W1) | (Y[5], 0) | (Y[5], W2+W1) |
| L[5] | (Y[3], 0) | – | (Y[6], 0) |
| L[6] | (Y[4], W3+W2) | – | (Y[6], W3) |
| L[7] | (Y[5],W2) | – | (Y[6], W3+W3) |
| L[8] | – | – | (Y[7], 0) |

MADR = BADR + STRD × LCUNT + WCUNT

SEMICONDUCTOR DEVICE AND IMAGE PROCESSING SYSTEM

CROSS-REFERENCE TO RELATED APPLICATIONS

The disclosure of Japanese Patent Application No. 2023-065148 filed on Apr. 12, 2023, including the specification, drawings and abstract is incorporated herein by reference in its entirety.

BACKGROUND

The present invention relates to a semiconductor device and an image processing system.

There is disclosed technique listed below.

(Patent Document 1) Japanese Unexamined Patent Application Publication No. 2010-86401

Patent Document 1 discloses a microcomputer capable of acquiring and transferring data in different areas in parallel to the storage circuit. The microcomputer includes a direct RAM interface (DRI) for capturing image data in a predetermined area of image data captured by a camera and transferring the image data to a memory block, and a CPU for controlling DRI to transfer image data of different areas of the image data captured by the camera to the memory block.

SUMMARY

For example, interface circuit based on MIPI (Mobile Industry Processor Interface) CSI-2 (Camera Serial Interface 2) standard or the like makes image data such as RAW data generated by an image sensor, i.e., a camera, and meta-data into packets and outputs the packet. The Image data and meta-data in the packets are stored in a memory, and are also processed by ISP (Image Signal Processor). The ISP converts RAW data into a RGB format, a YUV format, or the like by a demosaicing processing, and then writes the converted image data into a memory. Processing such as image recognition is performed using the converted image data, for example.

On the other hand, in recent years, in view of surround view systems and the like, MIPI CSI-2 standard is capable of supporting 16 virtual channels (VC), that is, 16 cameras, and 216 types of image formats, that is, data types (DT) of 216 types. In addition, for example, each of the cameras can output up to four types of images having different exposures, that is, can correspond to four exposure channels (EC). On the basis of these, the types of images outputted from the interface circuit are at most VC*EC*DT=16*4*65535 types. Therefore, the memory is to be used efficiently. In addition, an efficient mechanism for distinguishing such types of image data by type and storing them in the memory is required.

Embodiments described below have been made in view of the above, and other problems and novel features will be apparent from the description of the present specification and the accompanying drawings.

According to one embodiment, the invention is as follows.

Specifically, a semiconductor device according to one aspect of the present invention includes an interface circuit and a channel composite circuit. The interface circuit receives image data of a plurality of channels and outputs a plurality of packets including the image data of the plurality of channels, the plurality of channels including a first channel and a second channel, image data of the first channel being first channel image data and image data of the second channel being second channel image data. The channel composite circuit receives the plurality of packets and transmits the image data of the plurality of channels included in the plurality of packets to a memory. The first channel image data and the second channel image data include a plurality of line data, respectively. The interface circuit outputs a first packet including a k-th line data of the first channel image data, and outputs a second packet including a k-th line data of the second channel image data after outputting the first packet. The channel composite circuit transmits the k-th line data of the first channel image data to the memory to store in a first address area, and transmits the k-th line data of the second channel image data to the memory to store in a second address area following the first address area after the k-th line data of the first channel image data is stored in the memory.

The use of semiconductor device of one embodiment increases the efficiency use of memories.

BRIEF DESCRIPTION OF THE DRAWINGS

FIG. 1 is a schematic diagram illustrating a configuration example of an image processing system according to a first embodiment.

FIG. 4 is a timing chart schematically showing the input timing of packets to the channel composite circuit shown in FIG. 2.

FIG. 7 is a diagram showing a result of comparing various performances between the channel composite circuit shown in FIG. 2 and the channel composite circuit shown in FIG. 15.

FIG. 8 is a schematic diagram illustrating a schematic configuration example and an operation example of the channel composite circuit in FIG. 1 in the image processing system according to the second embodiment.

FIG. 10 is a schematic diagram illustrating a configuration example of start address data generated by the channel composite circuit illustrated in FIG. 8.

FIG. 12 is a diagram showing a result of comparing various performances between the channel composite circuit shown in FIG. 8 and the channel composite circuit shown in FIG. 15.

FIG. 13 is a schematic diagram illustrating a schematic configuration example and an operation example of the channel composite circuit in FIG. 1 in the image processing system according to the third embodiment.

FIG. 14 is a schematic diagram illustrating a configuration example of map data generated by the channel composite circuit illustrated in FIG. 13.

DETAILED DESCRIPTION

Figure 2:
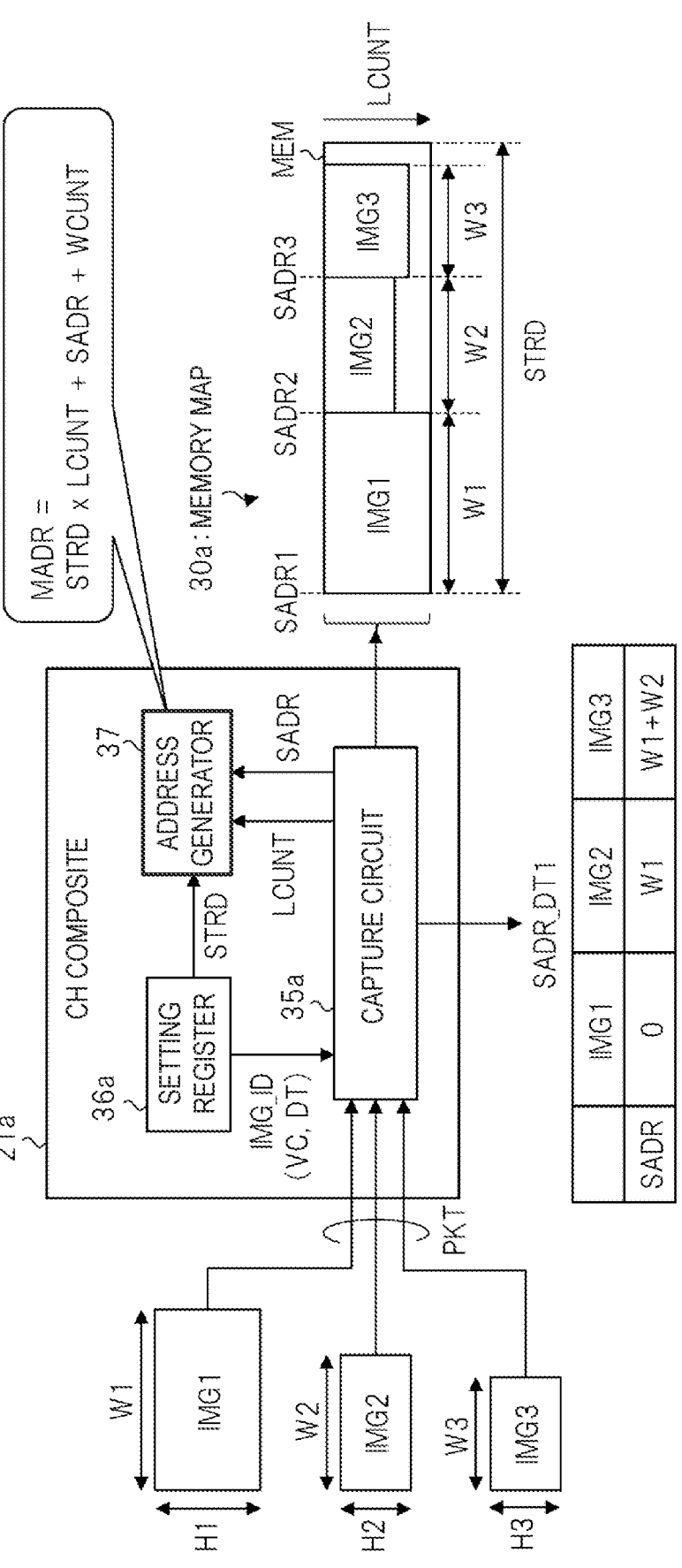
FIG. 2 is a schematic diagram illustrating a schematic configuration example and an operation example of the channel composite circuit in FIG. 1.

In the following embodiments, when required for convenience, the description will be made by dividing into a plurality of sections or embodiments, but except when specifically stated, they are not independent of each other, and one is related to the modified example, detail, supplementary description, or the like of part or all of the other. In the following embodiments, the number of elements, etc. (including the number of elements, numerical values, quantities, ranges, etc.) is not limited to the specific number, but may be not less than or equal to the specific number, except for cases where the number is specifically indicated and is clearly limited to the specific number in principle. Furthermore, in the following embodiments, it is needless to say that the constituent elements (including element steps and the like) are not necessarily essential except in the case where they are specifically specified and the case where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above numerical values and ranges.

Hereinafter, embodiments will be described in detail based on the drawings. In all the drawings for explaining the embodiments, members having the same functions are denoted by the same reference numerals, and repetitive descriptions thereof are omitted. In the following embodiments, descriptions of the same or similar parts will not be repeated in principle except when particularly necessary.

First Embodiment (Outline of Image Processing System)

Figure 1:
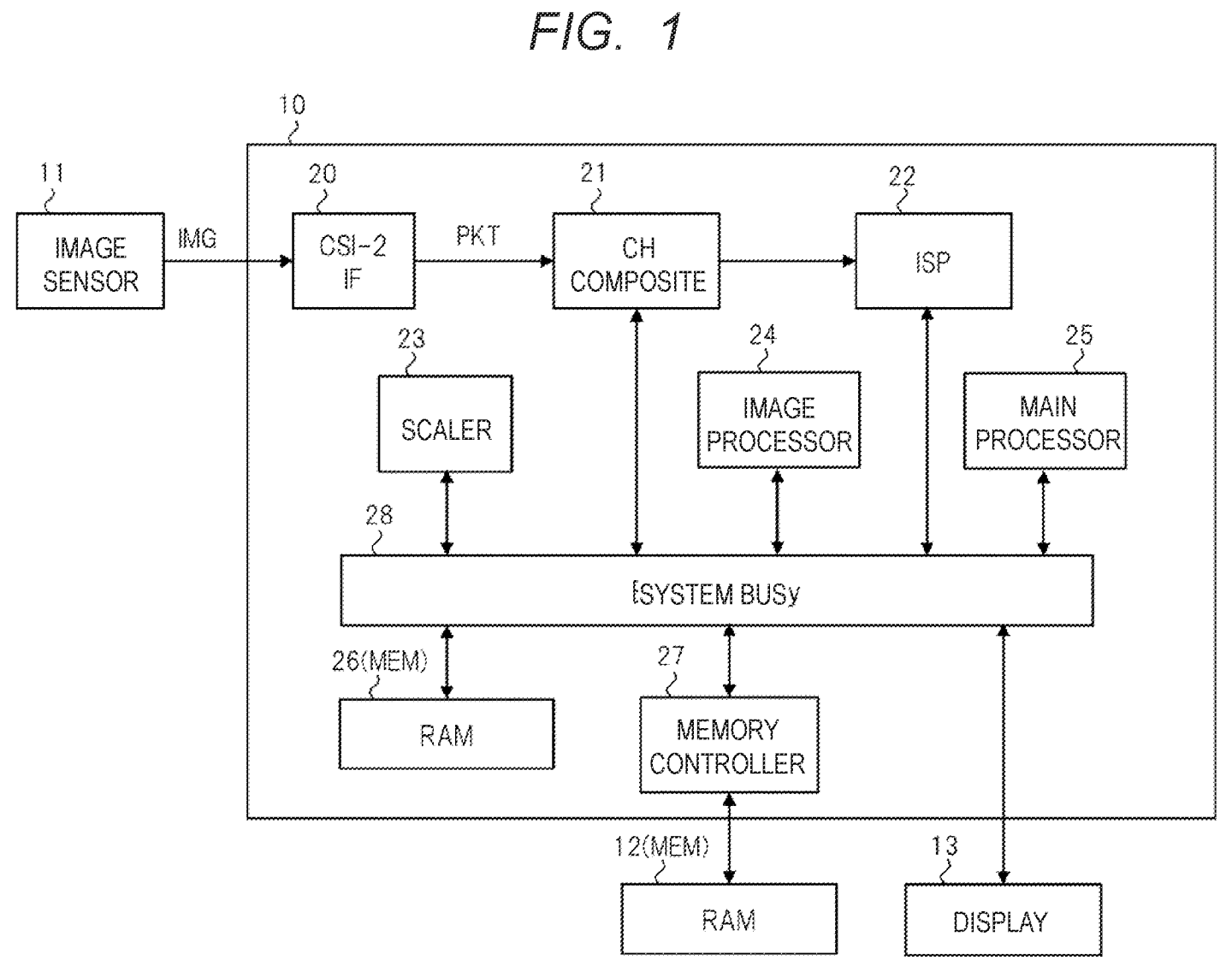

FIG. 1 is a schematic diagram illustrating a configuration example of an image processing system according to a first embodiment. The image processing system is, for example, used as an in-vehicle system such as a ADAS (Advanced Driver Assistance Systems). The image processor includes an image sensor 11, a semiconductor device 10, a RAM (Random Access Memory) 12 as an external memory, and a display 13. The image sensor 11 includes CMOS (Complementary Metal Oxide Semiconductor) type imaging elements or a CCD (Charge Coupled Device type imaging elements arranged in a matrix-like manner, in other words, pixels. The image sensor 11 captures image of an object and generates image data IMG of a plurality of channels, for example.

The RAM 12 is, for example, DRAM (Dynamic RAM). The display 13 is, for example, a liquid crystal display or an organic EL (Electro Luminescence) display. The semiconductor device 10 is, for example, an LSI (Large Scale Integration) for in-vehicle, and is, for example, a SoC (System on a Chip) or a microcontroller composed of a single semiconductor-chip. Note that a plurality of image sensors 11 may be provided.

The semiconductor device 10 performs image processing and image recognition processing on the image data IMG from the image sensor 11. The semiconductor device 10 displays images on the display 13 as needed. The semiconductor device 10 includes an interface circuit 20, a channel composite circuit 21, a ISP 22, a scaler 23, an image processor 24, a main processor 25, a RAM 26 that is an internal memory, a memory controller 27, and a system bus 28.

The system bus 28 interconnects, here, the channel composite circuit 21, the ISP 22, the scaler 23, the image processor 24, the main processor 25, the RAM 26, and the memory controller 27. The RAM 26 is composed of, for example, DRAM and SRAM (Static RAM). The memory controller 27 controls accessing to the RAM 12 as an external memory. The difference between the RAM 12 and the RAM 26 is an external memory or an internal memory, and the RAMs 12,26 is collectively referred to as a memory MEM in the specification when there is no need to distinguish between them. Although not shown, the semiconductor device 10 also includes a non-volatile memory in which programs and the like are stored.

The interface circuit 20 is, for example, a circuit having various functions based on MIPI CSI-2 standard. The interface circuit 20 inputs data transmitted from the image sensor 11. The data transmitted from the image sensor 11 includes image data IMG of the plurality of channels. The image data IMG is, for example, RAW data including pixel values of respective pixels based on a Bayer array.

The data transmitted from the image sensor 11 also includes meta-data. The meta-data is various pieces of information, such as a representative of the setting value of the image sensor 11, specific to the product. The interface circuit 20 appropriately makes the image data IMG of the plurality of channels and the meta-data into packets PKT, and outputs the plurality of packet PKT which the image data IMG or the meta-data is included in. The plurality of packet PKT have a format based on MIPI CSI-2 standard.

The channel composite circuit 21 receives the plurality of packet PKT from the interface circuit 20 and writes image data IMG and meta-data of a plurality of channels included in the plurality of packet PKT into the memory MEM. At this time, the channel composite circuit 21 identifies the image data IMG and the meta-data, further identifies the channel to which each data belongs, and writes each data to the memory MEM. In addition, the channel composite circuit 21 transmits image data IMG based on predetermined settings, such as image data IMG of a particular channel, to the ISP 22 as needed.

The ISP 22 performs processing, such as demosaicing processing, a HDR image generation processing of synthesizing image having a plurality of exposures to generate a HDR(High-Dynamic-Range image), a tone-mapping processing of a HDR image, a black-level correcting processing, and a color-space converting processing, on image data IMG of a plurality of channels stored in the memory MEM, or image data IMG transmitted from the channel composite circuit 21. In other words, these processing are corrections and format-conversion processing to be performed as a previous stage for performing image recognition processing on the captured RAW image data at the scaler 23, the image processor 24, or the like. For example, in the demosaicing processing, the ISP 22 performs a processing of interpolating pixel values of colors that are missing with respect to the target image data IMG, for example, RAW data based on the Bayer array. Thus, image data having RGB format, YUV format, and the like are generated. Then, the ISP 22 writes the image data after the image processing into the memory MEM.

For example, the scaler 23 generates an entire reduced image or the like by changing the scale of the image with respect to the image data after the image processing stored in the memory MEM. The image processor 24 is an image recognition processor such as a GPU (Graphics Processing Unit) or an accelerator. The image processor 24 performs image recognition processing on the image data after the image processing stored in the memory MEM by the ISP 22 or the image data IMG of the plurality of channels stored in the memory MEM by the channel composite circuit 21. The image recognition processing is, for example, an object detection processing using a neural network.

The main processor 25 is composed of, for example, a CPU (Central Processing Unit) or a combination of a CPU and a DSP (Digital Signal Processor. The main processor 25 executes programs stored in the RAM 26 or the like to control a entire processing sequence of the semiconductor device 10 including image processing and image recognition processing. That is, the main processor 25 controls the entire process sequence of the semiconductor device 10 in cooperation with the various internal circuits included in the semiconductor device 10 as appropriate.

(Outline of Channel Composite Circuit)

Figure 3:
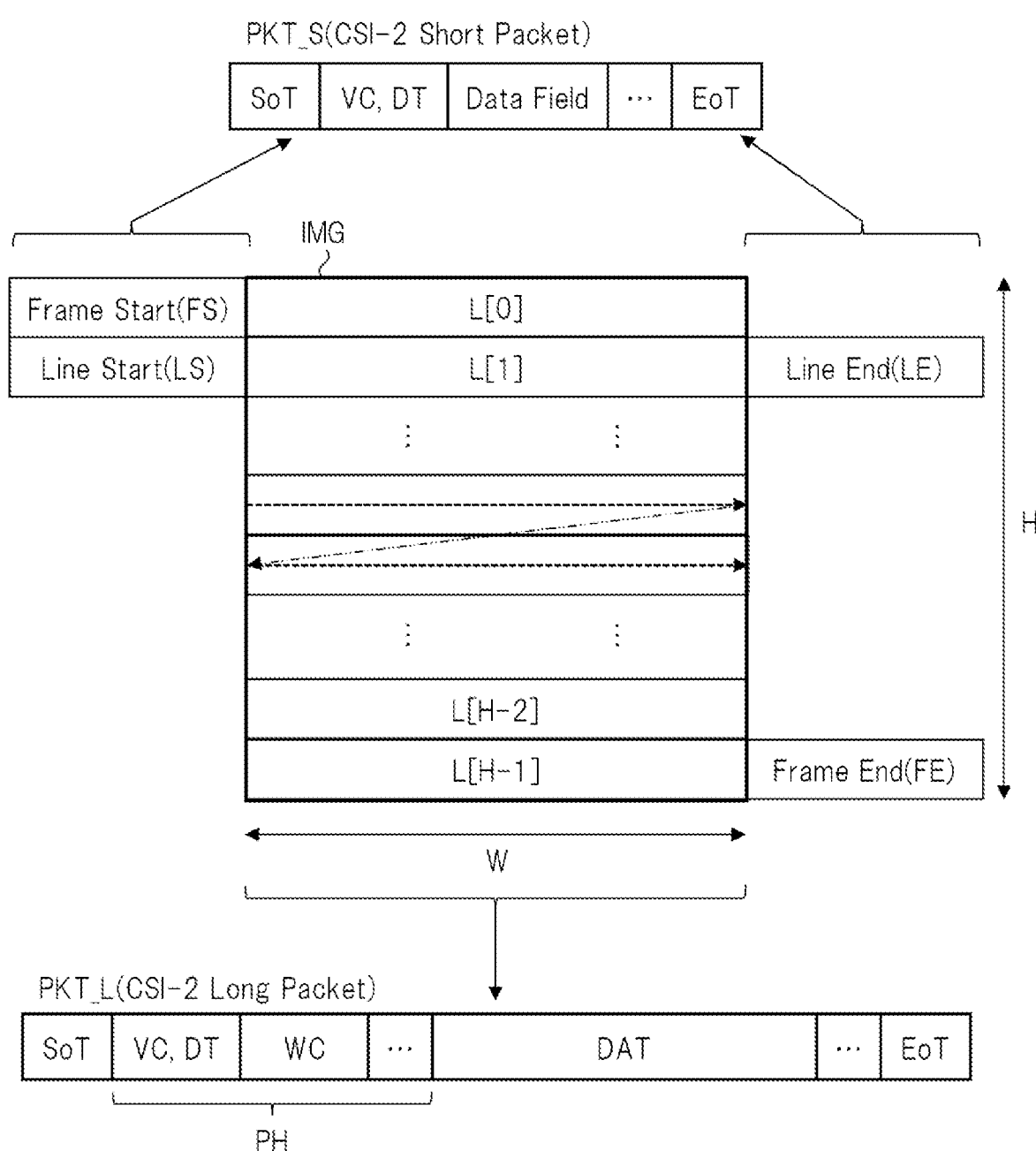
FIG. 3 is a schematic diagram illustrating an example of a format of a packet output by the interface circuit in FIG. 1.
Figure 4:
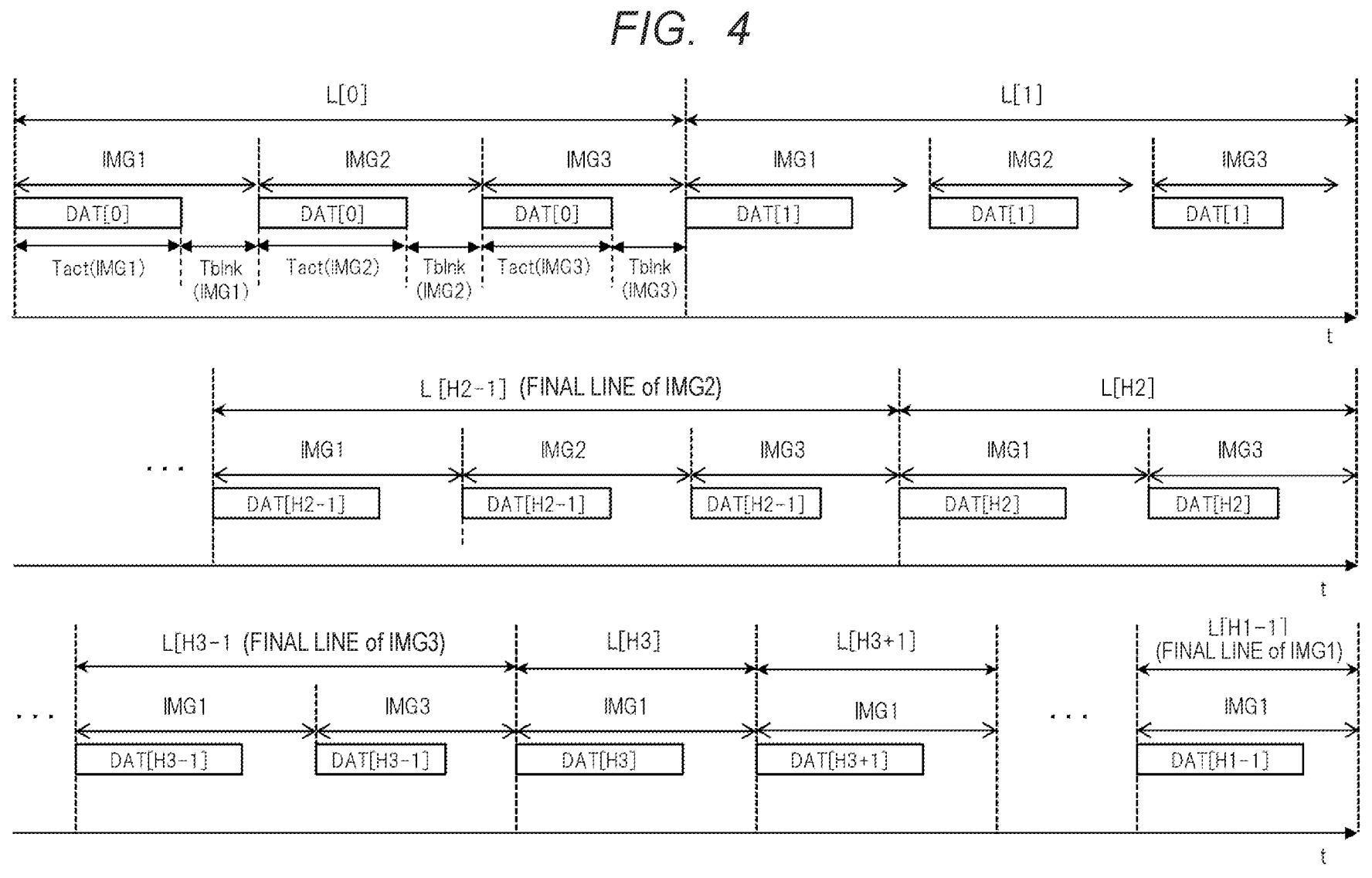

FIG. 2 is a schematic diagram illustrating a schematic configuration example and an operation example of the channel composite circuit in FIG. 1. FIG. 3 is a schematic diagram illustrating an example of a format of a packet output by the interface circuit in FIG. 1. FIG. 4 is a timing chart schematically showing the input timing of a packet to the channel composite circuit shown in FIG. 2.

As illustrated in FIG. 3, in MIPI CSI-2 standard, a short packet PKT_S and a long packet PKT_L are defined. The short packet PKT_S is a packet for notifying, for example, a FS (Frame Start)/FE (Frame End) indicating the start/end of the image data IMG, a LS (Line Start)/LE (Line End) indicating the start/end of each of the H lines L[0]-L[H−1] constituting the image data IMG, and the like.

The short packet PKT_S contains a value of a virtual channel (VC) and a value of a data type (DT). The value of the virtual channel (VC) and the value of the data type (DT) are set based on the data added to the data transmitted from the image sensor 11. The virtual channel (VC) is set, for example, to identify individual image sensor 11, i.e. individual camera. The data type (DT) is set to identify, for example, the type of data such as image data, meta-data, black level correction data, or the type of image formats. In addition, the short-packet PKT_S contains Data Field. For example, a value indicating FS (Frame Start)/FE (Frame End) or LS (Line Start)/LE (Line End) is set in the Data Field.

On the other hand, the long packet PKT_L is a packet for transmitting respective line data DAT of H lines L[0]-L[H−1] constituting the image data IMG. The long packet PKT_L contains a header information PH in addition to the line data DAT. The header-information PH is composed of the value of word count (WC) in addition to the value of the virtual channel (VC) and the value of the data type (DT) same to the case of the short-packet PKT_S.

The value of word count (WC) represents the size of the line data DAT included in the packet. For example, when one line data DAT is transmitted by one long packet PKT_L, the value of word count (WC) is the line size W of the image data IMG. Note that the meta-data is also transmitted by the long packet PKT_L in the same manner as in the line data DAT.

In the exemplary embodiment of FIG. 2, the channel composite circuit 21a receives three packets PKT, detail three long packets PKT_L, which including channel image data IMG1-IMG3, respectively, via the interface circuit 20 (not shown). The channel composite circuit 21a recognizes three channels based on a combination of a value of a virtual channel (VC) and a value of a data type (DT) included in the header information PH. The image data IMG1-IMG3 of the three channels have a line size W1-W3 and a line number H1-H3, respectively. In this case, the relation between W1-W3 is explained as W1>W2>W3 and the relation between H1-H3 is explained as H1>H3>H2.

Assuming such three channel image data IMG1-IMG3, the interface circuit 20 outputs the packets PKT at the timing shown in FIG. 4, for example. That is, in FIG. 4, the interface circuit 20 outputs a plurality of packet PKT each including line data included in the image data IMG1-IMG3 of three channels in a fixed channel order for each line.

Specifically, the interface circuit 20 first outputs the line data DAT[0] of the line L[0] included in each of the image data IMG1-IMG3 of the three channels. In other words, the interface circuit 20 outputs the three long packets PKT_L each including the line data DAT[0], in the order of the channels 1, 2, and 3. At this time, the interface-circuit 20 outputs the line data DAT[0] of a certain channel in the active-period Tact, and then outputs the line data DAT[0] of the subsequent channel through the predetermined blank-period Tblnk.

Subsequently, the interface circuit 20 outputs the line data DAT[1] of the following line L[1] included in the image data IMG1-IMG3 of the three channels, and more specifically, outputs the three long packets PKT_L including the line data DAT[1] in the same order as the channels 1, 2, and 3. Thereafter, in a similar manner, the packets are outputted. Note that since the final line of the image data IMG2 is the line L[H2−1], the image data IMG2 is not outputted after the line L[H2] following the line L[H2−1]. Similarly, since the final line of the image data IMG3 is the line L[H3−1], the image data IMG3 is not outputted after the line L[H3] following the line L[H3−1].

In FIG. 2, the channel composite circuit 21a includes a capture circuit 35a, a setting register 36a, and an address generator 37. The channel composite circuit 21a generally operates as follows. First, as shown in FIG. 4, as input of the channel composite circuit 21a, the interface circuit 20 makes the image data of the first channel, for example, the k-th line data included in IMG1, for example, DAT[k], into the first packet PKT and outputs them. After that, the interface circuit 20 makes the k-th line data DAT[k] included in the image data IMG2 of the second channel into the second packet PKT and outputs the second packet PKT.

On the other hand, when the first packet PKT is inputted to the channel composite circuit 21a, the channel composite circuit 21a writes, to the memory MEM, the k-th line data DAT[k] included in the image data IMG1 of the first channel into the first address area. After that, when the second packet PKT is inputted to the channel composite circuit 21*a*, the channel composite circuit 21*a* writes, to the memory MEM, the k-th line data DAT[k] included in the image data IMG2 of the second channel into the second address area which is consecutive to the first address area.

Specifically, the setting register 36*a* includes, for example, a channel setting register and a line stride register. The value of the virtual channel (VC) and the value of the data type (DT) for each channel identifier IMG ID are set in the channel setting register. That is, the respective channels are distinguished by combining the value of the virtual channel (VC) and the value of the data type (DT). A line stride value STRD is set in the line stride register.

The line stride value STRD is set to a value larger than the total value of the line sizes W in the image data IMG of the plurality of channels. Under that condition, the line stride value STRD is preferably determined to be i times of BW, where i is an integer greater than or equal to 1, and BW is the bus width of the memory MEM, where i is the smallest.

In FIG. 2, the line stride value STRD is set to a value slightly larger than the total value of the line sizes of the image data IMG1-IMG3, which is W1+W2+W3, as shown in the memory map 30*a*. However, if the total value of the line sizes, W1+W2+W3, matches the value i times of BW, the value of the line stride value STRD may be the total value of the line sizes, W1+W2+W3. With such a setting, for example, when the bus width BW of the memory MEM is 32 bytes, the difference between the value of the line stride value STRD and if the total value of the line sizes, W1+W2+ W3 is a value less than 32 bytes.

The capture circuit 35*a* identifies channels to which the inputted plurality of packet PKT belong, based on the setting content of the channel setting register in the setting register 36*a*, that is, the value of the virtual channel (VC) and the value of the data type (DT). Then, the capture circuit 35*a* extracts the line data DAT included in the packet PKT as the line data DAT of the identified channel. The extracted line data DAT is written to the memory MEM. The address generator 37 generates a memory address MADR for writing the extracted line data DAT to the memory MEM. The address generator 37, in detail, generates the memory address MADR based on Equation (1).

$$MADR = STRD * LCUNT + SADR + WCUNT \qquad (1)$$

In Equation (1), LCUNT is a line count number. For example, the capture circuit 35*a* increments the value of the line count number LCUNT when the line data of all the channels, three channels in the embodiment shown in FIG. 2, are written to the memory MEM for each line. Consequently, the line start address for each line is represented by STRD*LCUNT.

SADR is a relative address from the line start address for each line, and represents the start address for each channel of the line data DAT. In FIG. 2, as illustrated in FIG. 4, since the order of channels of the inputted line data DAT is fixed, the start address SADR is also fixed. In the case of FIG. 2, the start address SADR is 0, W1, W1+W2 for the image data IMG1, IMG2, IMG3, respectively. The line size W1-W3 is a known value and is set in advance in the setting register 36*a*, for example.

WCUNT represents the relative address from the start address SADR and is an in-line count value that defines the byte position within the line size W. The in-line count value WCUNT is sequentially updated based on the data size that has been written to the memory MEM.

With such a configuration and operation, a memory map 30*a* as shown in FIG. 2 is formed in the memory MEM. That is, the channel composite circuit 21*a* continuously writes, to the memory MEM, the k-th line data DAT included in the image data IMG1-IMG3 as image data of all the channels from the line start address based on LCUNT multiple of the line stride value STRD, using the value of the line count number LCUNT as an integer. Furthermore, the channel composite circuit 21*a* continuously writes the (k+1)-th line data DAT included in the image data IMG1-IMG3 as image data of all the channels from the line start address based on the (LCUNT+1) multiple of the line stride value STRD.

When the memory map MEM is formed with the memory map 30*a* as shown in FIG. 2, when the image data IMG of the desired channel is read from the memory MEM, the start address SADR for each channel of the line data is required. Therefore, the channel composite circuit 21*a* stores the start address SADR for each channel of the line data as the start address data SADR_DT1 in a predetermined storage area that is a register or a memory. The start address SADR indicates a relative address from the line start address.

Then, for example, the ISP 22 or the image processor 24 refers to the start address data SADR_DT1 stored in the predetermined storage area to execute a process on the image data IMG of the plurality of channels stored in the memory MEM. Based on the start address data SADR_DT1, the ISP 22 or the image processor 24 recognizes the memory address MADR in which the image data IMG of the required channel are stored, and reads the image data IMG from the memory MEM. For this reason, the predetermined storage area is provided at a location that can be referred to by the ISP 22 or the image processor 24.

Comparative Example

Figure 15:
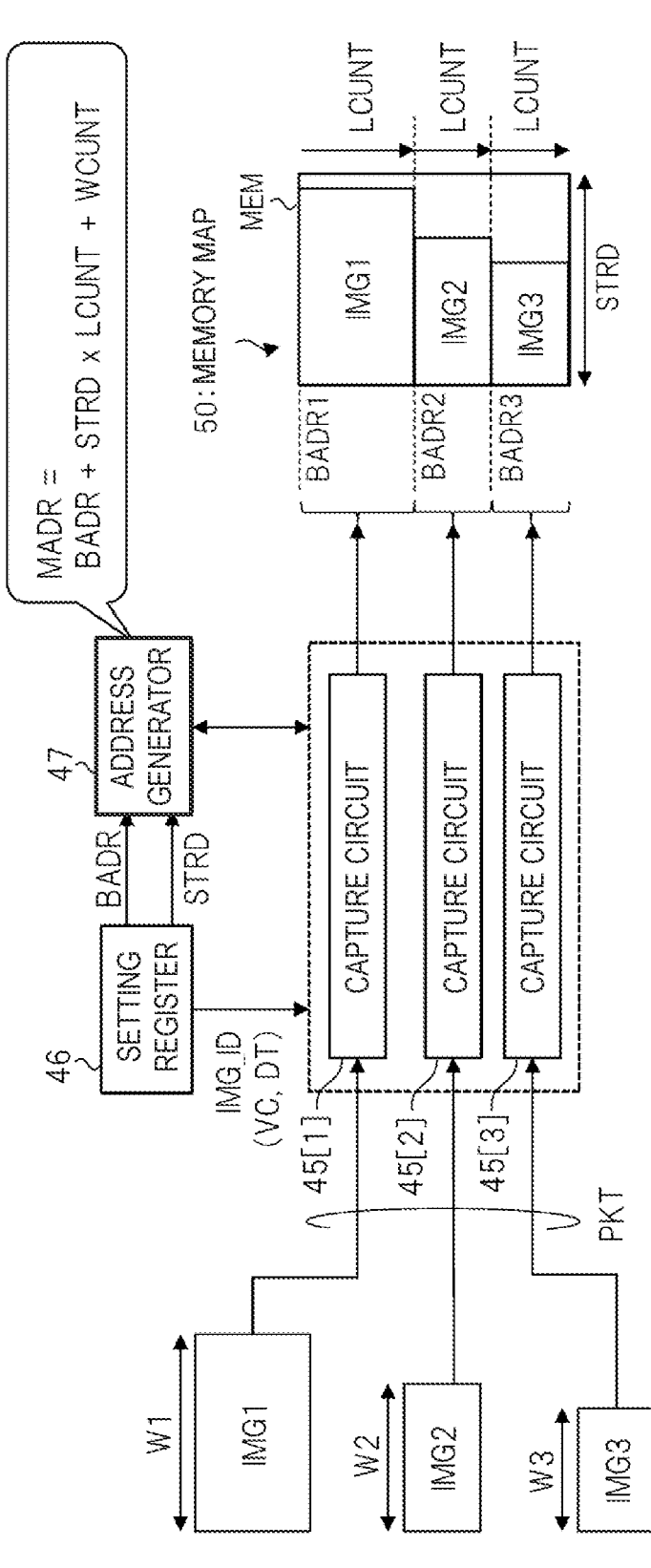
FIG. 15 is a schematic diagram illustrating a schematic configuration example and an operation example of a channel composite circuit as a comparative example with respect to FIG. 2.

FIG. 15 is a schematic diagram illustrating a schematic configuration example and an operation example of a channel composite circuit as a comparative example with respect to FIG. 2. The channel composite circuit shown in FIG. 15 comprises a capture circuit for each channel, here three capture circuits 45[1]-45[3] for three channels. Each of the capture circuit 45[1]-45[3] receives only packets PKT including the value of the virtual channel (VC) and the value of the data type (DT) assigned to it.

The address generator 47 generates the memory address MADR based on Equation (2). BADR is a base address to which a start address for each channel is set. STRD, LCUNT, WCUNT are a line stride value, a line count number, and an in-line count value, respectively, as in Equation (1). However, unlike in FIG. 2, the line stride value STRD is determined based on the largest line size of the line size W1-W3 of the image data IMG1-IMG3 of the three channels, here, W1.

$$MADR = BADR + STRD * LCUNT + WCUNT \qquad (2)$$

With such a configuration and operation, the channel composite circuit of the comparative example forms a memory map 50 as shown in FIG. 15 in the memory MEM. That is, the channel composite circuit writes the image data IMG1 in the area from the base address BADR1 to the base address BADR2, writes the image data IMG2 in the area from the base address BADR2 to the base address BADR3, and writes the image data IMG3 in the area after the base address BADR3. In addition, the channel composite circuit is configured to write one line data DAT in the respective channels, and then to update the address with the line stride value STRD as a unit.

As described above, in the channel composite circuit as the comparative example, the number of capture circuits also increases in accordance with the increase in the number of channels. For example, in a surround view system with sixteen cameras, each with four exposure channels, image data DAT of 64(=16*4) channels are inputted. In this case, 64 capture circuits are required. For this reason, in a system having a large number of channels to be handled, such as a surround view system, in particular, a reduction in circuit area, in other words, an increase in circuit efficiency is required.

In addition, the line stride value STRD is set to an integral multiple of the bus width BW, as in FIG. 2, in order to efficiently access the memory MEM. Consequently, an unused space may be created for each line data DAT in one channel. The unused space is accumulated as the number of channels increases. Therefore, it is required to increase the usage efficiency of the memory MEM.

On the other hand, in the channel composite circuit 21a according to the first embodiment shown in FIG. 2, the capture circuit 35a is shared by a plurality of channels. For this reason, in particular, in a system in which the number of handled channels is large, the circuit area can be reduced, in other words, the circuits can be made more efficient. Further, in the channel composite circuit 21a, unused spaces may occur for a plurality of line data DAT in a plurality of channels, and for each of three line data DAT in the example of FIG. 2. Therefore, unused space is not particularly accumulated even if the number of channels increases. As a consequence, the use-efficiency of the memory MEM can be increased.

(Details of Channel Composite Circuit)

Figure 5A:
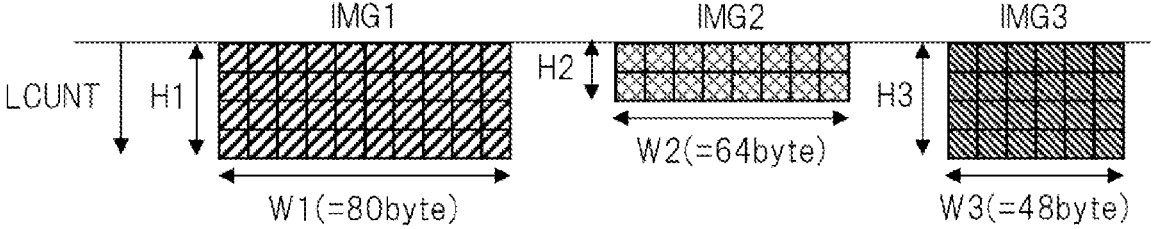
FIG. 5A is a schematic diagram for comparing a specific example of a memory map formed between the channel composite circuit shown in FIG. 2 and the channel composite circuit shown in FIG. 15.
Figure 5B:
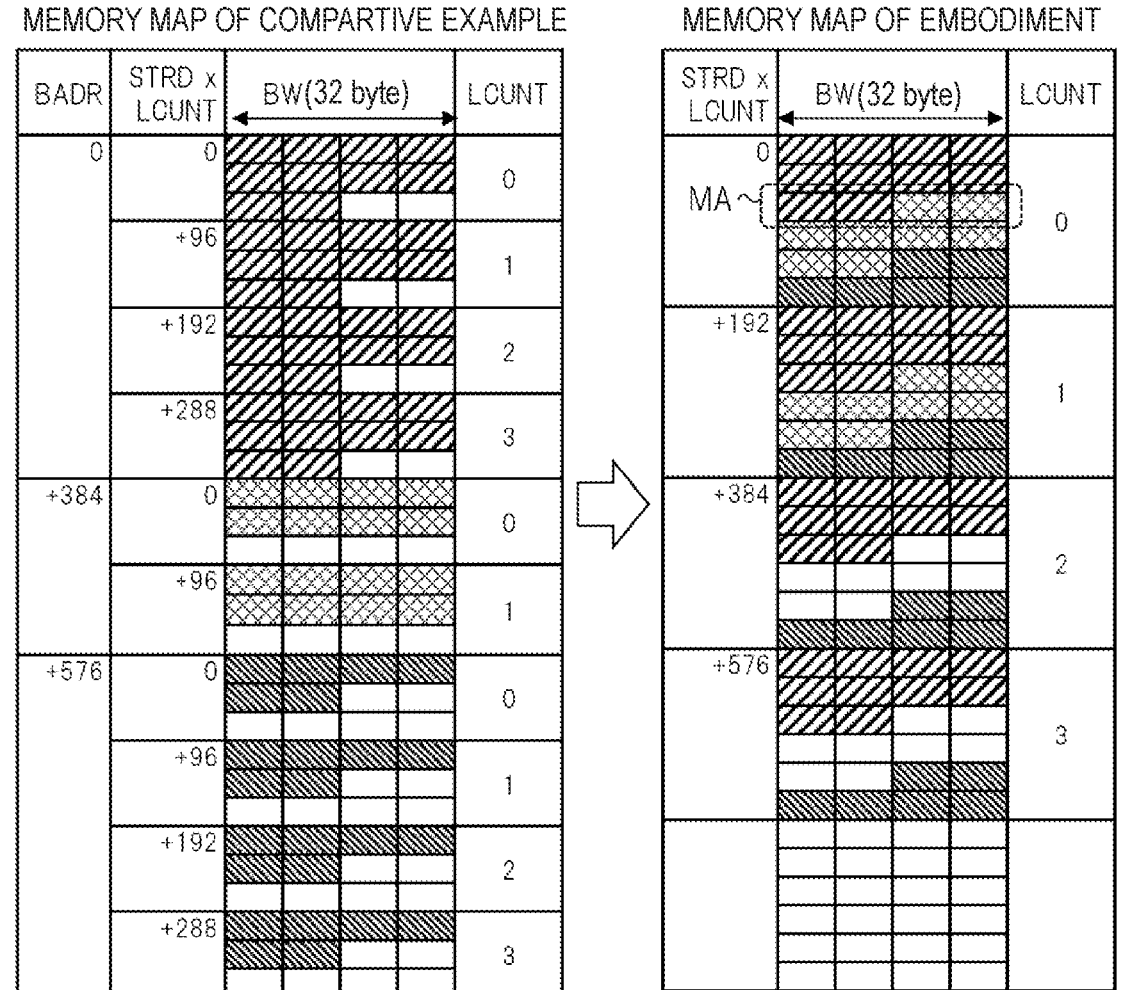
FIG. 5B is a schematic diagram for comparing a specific example of a memory map formed between the channel composite circuit shown in FIG. 2 and the channel composite circuit shown in FIG. 15.

FIG. 5A and FIG. 5B are schematic diagrams for comparing embodiments of memory map formed by the channel composite circuit shown in FIG. 2 and the channel composite circuit shown in FIG. 15. FIG. 5A shows image data IMG1-IMG3 of the three channels that are inputted to the channel composite circuit. Here, for the simplification of explanation, H1, H2, H3 of the number of lines of the image data IMG1-IMG3 are 4, 2, and 4, respectively. The line size W1, W2, W3 of the image data IMG1-IMG3 are 80 bytes, 64 bytes, and 48 bytes, respectively. As shown in FIG. 5B, the bus width BW of the memory MEM is 32 bytes.

In this case, as shown in the memory map according to the comparative example in FIG. 5B, in the channel composite circuit shown in FIG. 15, the address of the 0th byte is set as a base address for image data IMG1, the address of the 384th byte is set as a base address for image data IMG2, and the address of the 576th byte is set as a base address BADR for image data IMG3. In addition, as the line stride value STRD, 96 byte (=BW*3) based on the largest line size W1) is set. With such a setting, the image data IMG1-IMG3 are written in the memory MEM, so that the memory map according to the comparative example is formed.

On the other hand, as shown in the memory map according to the embodiment in FIG. 5B, in the channel composite circuit 21a shown in FIG. 2, a line start address is set for every 192 bytes (=BW*6) based on the total value of the line size W1-W3 that is a line stride value STRD. With such a setting, the image data IMG1-IMG3 is written in the memory MEM, so that the memory map according to the embodiment is formed. As can be seen from comparing the two memory maps, by using the channel composite circuit 21a shown in FIG. 2, generation of unused-space can be suppressed, and the use-efficiency of the memory MEM can be enhanced.

In the memory map according to the embodiment, for example, in the storage area MA from the 64th byte to the 95th byte, the line data DAT of the image data IMG1 is stored in the first half of the bus width BW of the memory MEM, and the line data DAT of the image data IMG2 is stored in the second half. For example, when the respective line data DAT are written in the order of the image data IMG1 and the image data IMG2, the channel composite circuit 21a may apply the data mask signal to the first half when writing the line data DAT of the image data IMG2 to the storage area MA.

Alternatively, the channel composite circuit 21a may temporarily hold the line data DAT of the image data IMG1 and may generate data to be written in the storage area MA at the stage of extracting the line data DAT of the image data IMG2. When the line data DAT is read from the storage area MA, the first half can be recognized as the line data DAT of the image data IMG1 and the second half can be recognized as the line data DAT of the image data IMG2 by using the start address data SADR_DT1 shown in FIG. 2.

Figure 6A:
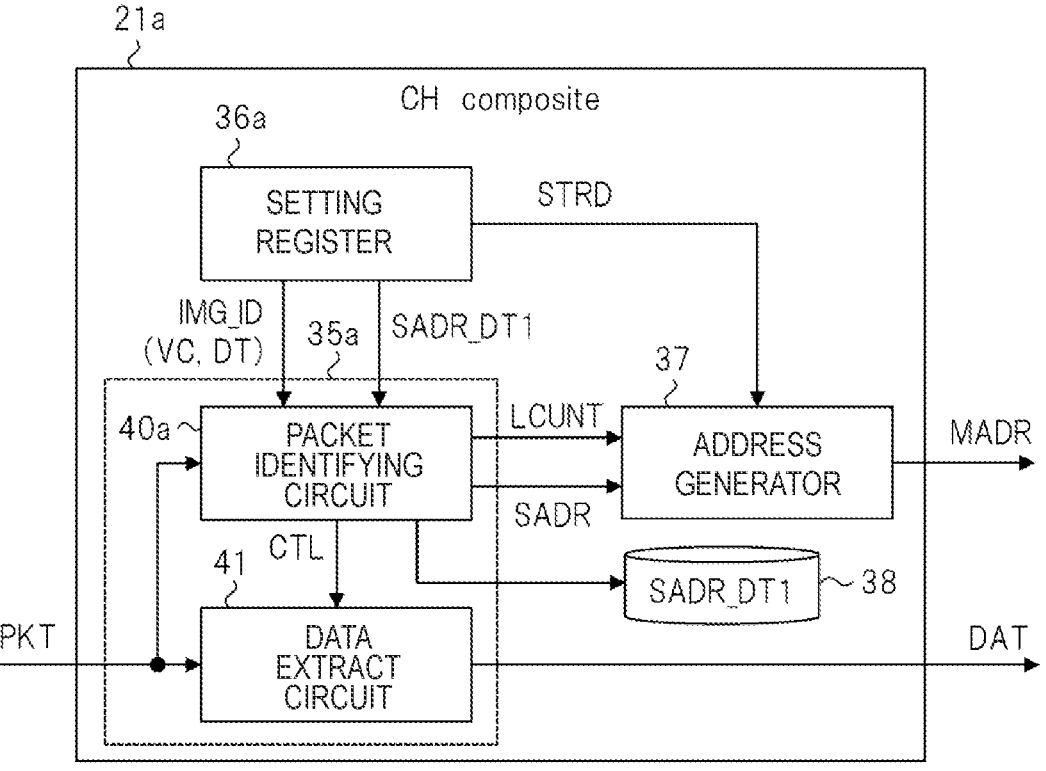
FIG. 6A is a block diagram illustrating a detailed configuration of the channel composite circuit shown in FIG. 2.
Figure 6B:
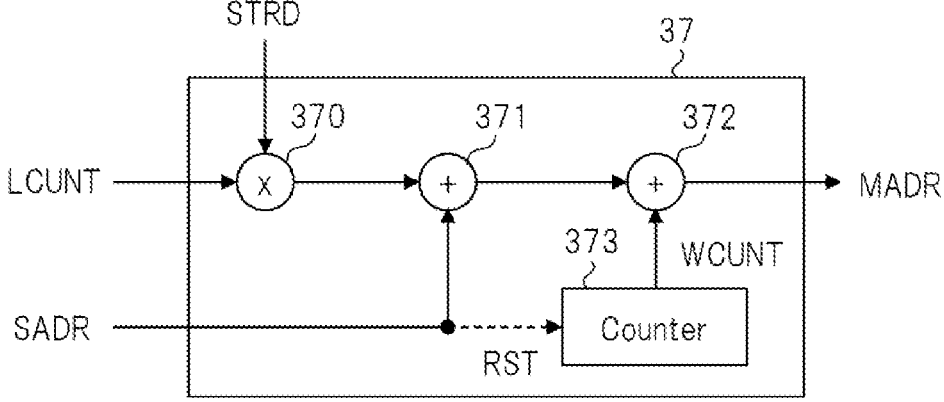
FIG. 6B is a block diagram illustrating a detailed configuration of an address generator in FIG. 6A.

FIG. 6A is a circuit block showing a detailed configuration example of the channel composite circuit shown in FIG. 2, and FIG. 6B is a circuit block showing a detailed configuration example of the address generator in FIG. 6A. The channel composite circuit 21a shown in the FIG. 6A includes a packet identifying circuit 40a and a data extract circuit 41 as the capture circuit 35a shown in FIG. 2.

The setting register 36a also includes a start address register in addition to the channel setting register and the line stride register described in FIG. 2. The start address data SADR_DT1 shown in FIG. 2 is set in the start address register. The value of the virtual channel (VC) and the value of the data type (DT) for each channel identifier IMG ID are set in the channel setting register, and the line stride value STRD is set in the line stride register.

The packet identifying circuit 40a identifies the incoming long packet PKT_L and the short packet PKT_S. In addition, as described with reference to FIG. 2, the packet identifying circuit 40a stores the start address data SADR_DT1 in the storage area 38, which is a register or a memory, in order to appropriately perform a read operation by the ISP 22 or the image processor 24. The storage area 38 may be the setting register 36a or the memory MEM.

Specifically, the packet identifying circuit 40a identifies channels to which a plurality of inputted packet PKT, for example, long packets PKT_L belong, based on the header information PH of the respective packet PKT. That is, the packet identifying circuit 40a identifies the channel by referring to the channel setting register using the value of the virtual channel (VC) and the value of the data type (DT) included in the header-information PH.

The packet identifying circuit 40a outputs the start address SADR of the target channel to the address generator 37 based on the start address register every time the switching of the channel is detected. Further, the packet identifying circuit 40a increments the line count number LCUNT after inputting the line data DAT of all the channels for each line. The packet identifying circuit 40a provides the incremented line count number LCUNT to the address generator 37.

Here, whether or not the line data DAT of all the channels is inputted for each line may be determined based on, for example, LE (Line End) included in the short-packet PKT_S. The number of channels per line varies according to the number of lines H of the respective image data IMG. The packet identifying circuit 40a can recognize changes in the numbers of channels per line based on, for example, FE (Frame End) included in the short packet PKT_S.

The data extract circuit 41 extracts the line data DAT included in the respective packet PKT, in detail, the long packet PKT_L, based on the control signal CTL from the packet identifying circuit 40a. The data extract circuit 41 divides the extracted line data DAT based on the memory MEM bus width BW, and sequentially outputs the divided line data DAT to the memory MEM. At this time, the data extract circuit 41 also executes processes required in the storage area MA as described in FIG. 5B.

The address generator 37 comprises a multiplier 370, two adders 371,372, and in-line counter 373, as shown in the FIG. 6B. The multiplier 370 performs multiplication between the line count number LCUNT from the packet identifying circuit 40a and the line stride value STRD from the setting register 36a. The adder 371 adds the start address SADR from the packet identifying circuit 40a to the multiplication from the multiplier 370.

For example, the in-line counter 373 sequentially count up/down using the bus width BW of the memory MEM as a unit, thereby outputting the in-line count value WCUNT. In addition, the in-line counter 373 resets the count value by using the reset signal RST when the packet identifying circuit 40a issues a new start address SADR. The adder 372 adds the in-line count value WCUNT to the addition from the adder 371 to generate a memory address MADR. As a result, the memory address MADR shown in Equation (1) is generated.

FIG. 7 is a diagram showing a result of comparing various performances between the channel composite circuit shown in FIG. 2 and the channel composite circuit shown in FIG. 15. Here, they are compared in terms of circuit efficiency, bandwidth, standby power, and memory capacity. The efficiency of the circuit, the bandwidth, and the standby power are expressed by the ratio when the technique of the comparative example shown in FIG. 15 is set to 1. The effect of reducing the memory capacity is represented by the memory capacity that can be reduced by the technique of the embodiment.

(Efficiency of Circuit)

When the technique of the embodiment is used, the number of channels that can be captured under the same circuit area can be increased as compared with the technique of the comparative example. Therefore, when the image data IMG of M channels is captured by one capture circuit 35a, the efficiency of the circuits can be increased by M times. In other words, the circuit area can be reduced to one M-th.

(Bandwidth)

The technique of the embodiment has overhead associated with the notification of the start address data SADR_DT1 against the technique of the comparative example. If the start address SADR is 32 bits (=4 bytes) and the number of channels is M, the start address data SADR_DT1 is (M*4) bytes. On the other hand, if data of one pixel is 1 byte, the size of the output data by the image sensor 11 is, for example, (1920*1080) bytes for one full HD image data per one camera, and (1920*2) bytes in the meta-data. In a surround view system or the like, the value of M is usually 100 or less. Therefore, the data size of the start address data SADR_DT1 is sufficiently small compared to the data size to be captured, and the overhead (a') of the bandwidth is also negligibly small.

(Standby Power)

In the technique of the embodiment, if the number of channels is set to M, the number of capture circuits can be set to one M-th as compared with the technique of the comparative example. Therefore, the standby power of one capture circuit according to the technique of the embodiment is reduced to one M-th compared to the standby power of M capture circuits according to the technique of the comparative example, for example, the standby power accompanying clocking.

(Memory Capacity)

For example, if the bus width BW of the memory MEM is 32 bytes, in the technique of the comparative embodiment, an unused space of less than 32 bytes is generated for each of the line data DAT of M channels. If the size of the unused space is randomly determined, the average value of the size of the unused space is 16 bytes for one line data DAT. Here, the unused space generated for the line data DAT of the M channels is (M*16) bytes. On the other hand, in the technique of the embodiment, since unused space is generated for the line data DAT of M channels, the unused space can be compressed to one M-th.

Modified Example

Here, one capture circuit 35a handles M channels. However, when the number of channels increases, for example, the line stride value STRD increases, and the bit-width of the respective circuits included in the address generator 37 needs to be increased. For this reason, for example, when the bit width is limited, a plurality of capture circuit 35a handling the channels up to the upper limit based on the bit width may be provided.

Also, the M channels handled by one capture circuit 35a may be a plurality of channels that are highly relevant in the process by the image processor 24. For example, when a plurality of image sensors each transfer a plurality of exposure amounts (exposures) and meta-data, the capture data that is highly relevant in the process of the image processor 24 may be collectively processed by one capture circuit 35a and stored in the memory. As a result, the image processor 24 can efficiently process the image data. Accordingly, a plurality of capture circuit may be provided that processes a plurality of channels that are highly relevant in processing by the ISP 22 or the image processor 24. Further, when it is desired to separate the memory area between the image data and the meta-data, a capture circuit for processing the meta-data of a plurality of channels and a capture circuit for processing the image data may be separately provided. In this way, the allocation of the corresponding channels in one capture circuit 35a may be changed as appropriate.

As described above, in the first embodiment, the channel composite circuit for writing line data of each channel into a continuous address area for each line is provided. As a result, the memory usage efficiency can be increased. Further, the circuit can be made more efficient. These effects are more pronounced as the number of channels increases.

Second Embodiment (Outline of Channel Composite Circuit)

Figure 8:
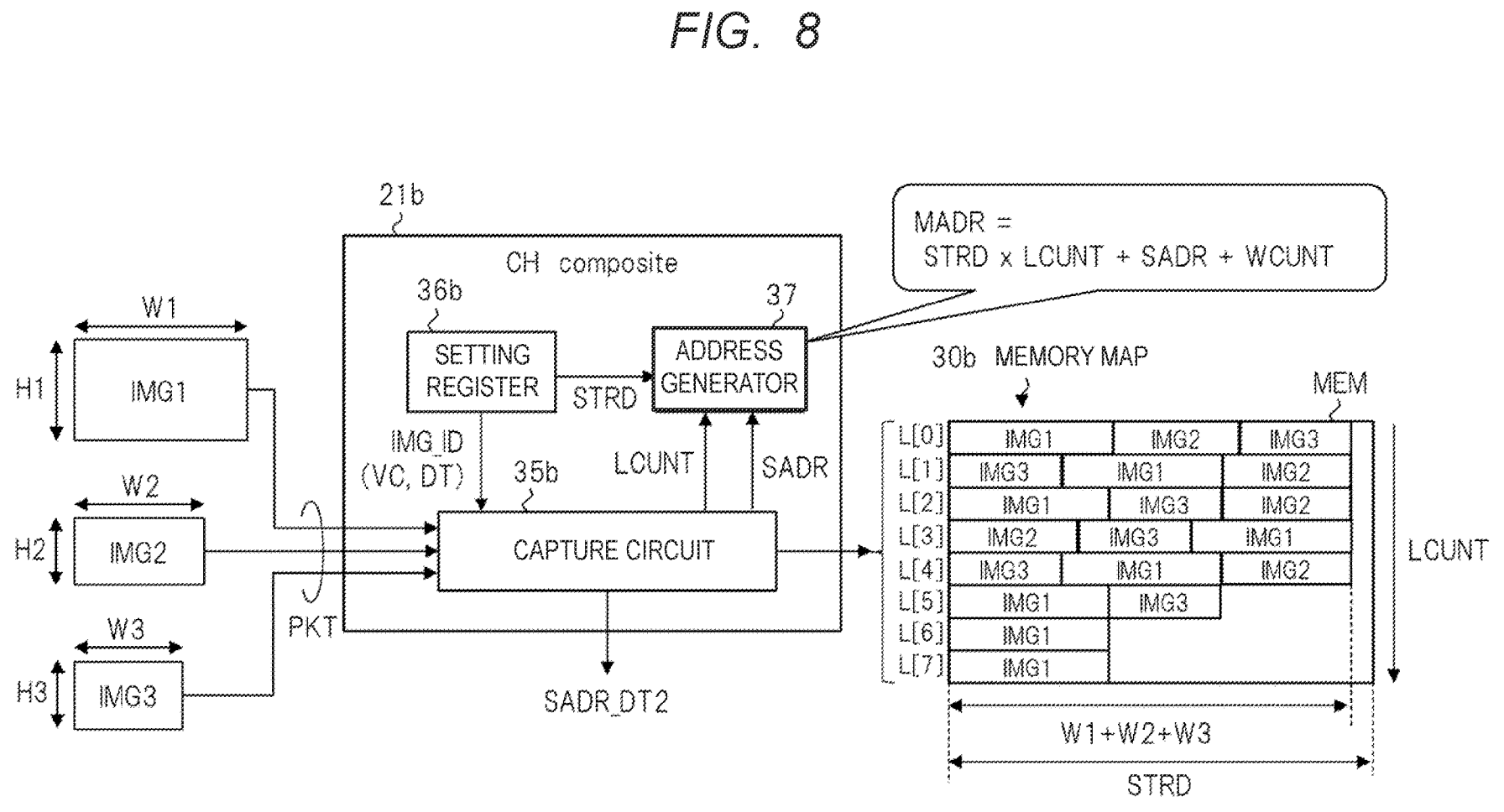
Figure 9:
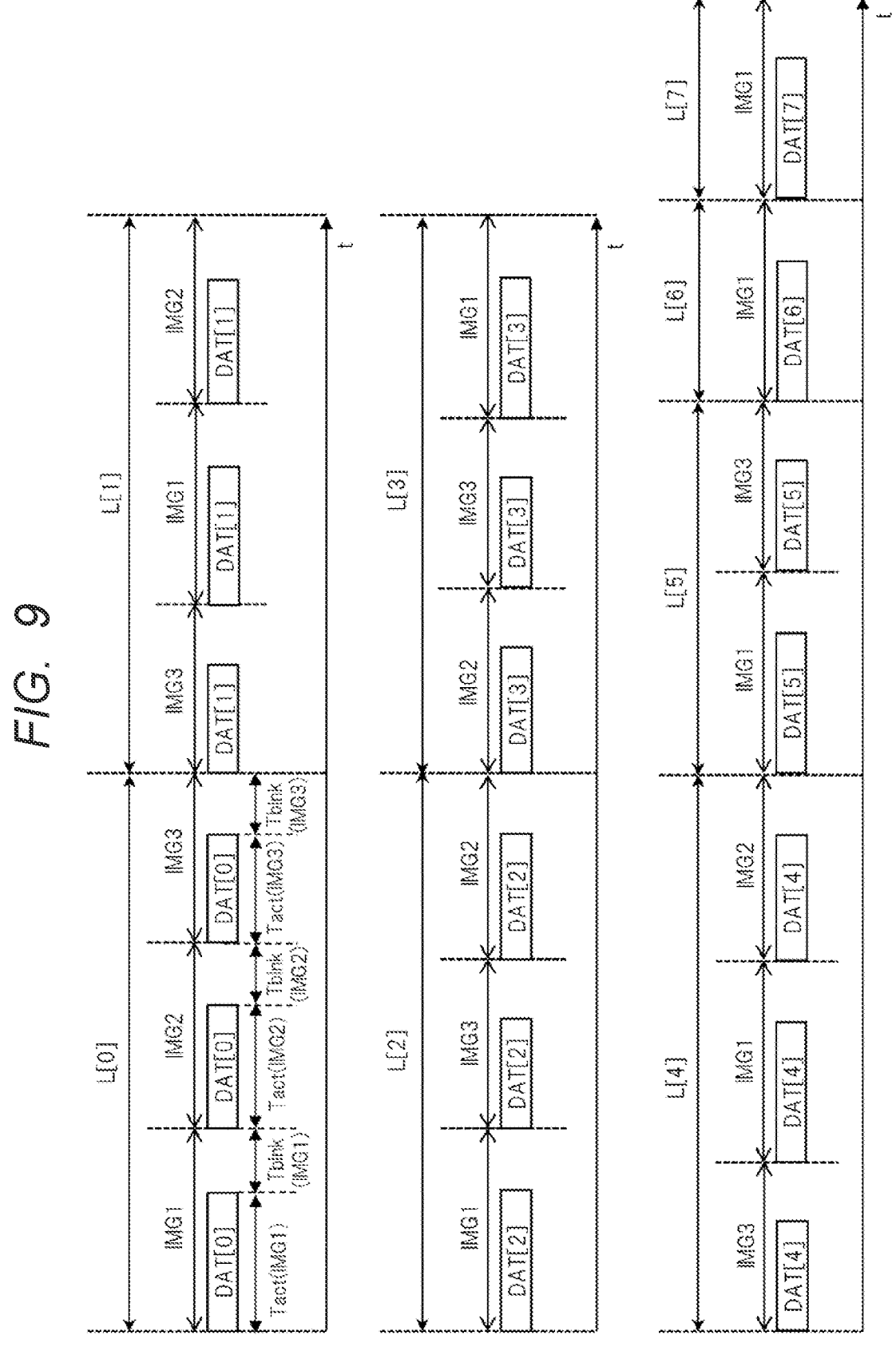
FIG. 9 is a timing chart schematically showing the input timing of packets to the channel composite circuit shown in FIG. 8.

FIG. 8 is a schematic diagram showing a schematic configuration example and an operation example of the channel composite circuit in FIG. 1 of an image processing system of the second embodiment. FIG. 9 is a timing chart schematically showing the input timing of packets to the channel composite circuit shown in FIG. 8. The channel composite circuit 21b shown in FIG. 8 is slightly different from that in FIG. 2 in the configuration of the setting register 36b and the configuration and operation of the capture circuit 35b. In the second embodiment, as shown in FIG. 9, the interface circuit 20 in FIG. 1 outputs a plurality of packets PKT each of which includes the line data DAT included in the image data IMG of a plurality of channels in a variable channel order for each of the line L[0]-L[7].

In FIG. 9, for example, in the line L[0], as in the case of FIG. 4, the line data DAT[0] of the image data IMG1, the line data DAT[0] of the image data IMG2, and the line data DAT[0] of the image data IMG3 are outputted in this order. On the other hand, in the following line L[1], unlike the case of FIG. 4, the line data DAT[1] of the image data IMG3, the line data DAT[1] of the image data IMG1, and the line data DAT[1] of the image data IMG2 are outputted in this order. Further, in the following line L[2], unlike the case of FIG. 4, the line data DAT[2] of the image data IMG1, the line data DAT[2] of the image data IMG3, and the line data DAT[2] of the image data IMG2 are outputted in this order.

Accordingly, unlike the case of FIG. 2, the channel composite circuit 21b shown in FIG. 8 recognizes the channel order for each line. Each channel is recognized based on the header information PH of the packet PKT, as in FIG. 2. In addition, as in FIG. 2, the channel composite circuit 21b writes the line data DAT for each line in the order of the inputted channels in consecutive address area in the memory MEM. However, in FIG. 8, as shown in the memory map 30b, the order of channels to be written differs for each line.

Thus, the channel composite circuit 21b, here the capture circuit 35b, generates the start address data SADR_DT2, which differs from that in the case of FIG. 2, and stores it in a predetermined storage area, which is a register or a memory. FIG. 10 is a schematic diagram illustrating a configuration example of start address data generated by the channel composite circuit illustrated in FIG. 8. The start address data SADR_DT1 illustrated in FIG. 2 has a start address SADR for each channel of the line data DAT. In other words, the start address data SADR_DT1 represents the start address SADR used in common manner between lines. On the other hand, the start address data SADR_DT2 illustrated in FIG. 10 represents the start address SADR of the channel for each line of the line data DAT.

Specifically, the operation of the capture circuit 35b when the line data DAT[1] of the line L[1] is received will be described. The capture circuit 35b receives, as the line data DAT[1] in the line L[1], the line data DAT[1] of the image data IMG3, the line data DAT[1] of the image data IMG1, and the line data DAT[1] of the image data IMG2 in this order. For example, when the line data DAT[1] of the image data IMG3 is received first in the line L[1], the capture circuit 35b stores 0 as a start address SADR (a relative address from the line start address) in an area assigned to the line L[1] and the image data IMG3 of the start address data SADR_DT2 in FIG. 10.

Subsequently, when the capture circuit 35b receives, as the second data of the line L[1], the line data IMG1 of the image data DAT[1], the capture circuit 35b stores W3 as the start address SADR in an area assigned to the line L[1] and the image data IMG1 of the start address data SADR_DT2 in FIG. 10. W3 is the line size of the first written image data IMG3.

Then, upon receiving the line data DAT[1] of the image data IMG2 as the third data of the line L[1], the capture circuit 35b writes W3+W1 as the start address SADR in an area assigned to the line L[1] and the image data IMG2 of the start address data SADR_DT2 in FIG. 10. W1 is the line size of the second written image data IMG1, and W3+W1 is the total value of the first and second written line sizes.

Here, the respective line size W1-W3 are set in advance in the setting register 36b. The capture circuit 35b generates the start address data SADR_DT2 based on the recognized variable channel order and the setting register 36b. In addition, the capture circuit 35b determines the start address SADR in the start address data SADR_DT2 and outputs the determined start address SADR to the address generator 37. Accordingly, the address generator 37 can generate the memory address MADR based on Equation (1).

The line data DAT of the channels inputted to the capture circuit 35b are written to the memory MEM based on the memory address MADR generated by the address generator 37. Like the first embodiment, the start address data SADR_DT2 is referred to by the ISP 22 or the image processor 24 to generate a memory address MADR for reading the image data IMG of the channels required for the process from the memory MEM.

In the start address data SADR_DT2 illustrated in FIG. 10, unnecessary information ("—") is stored in an area where the start address SADR does not exist. For example, the capture circuit 35b identifies FE (Frame End) of the image data IMG2 contained in the short packet PKT_S after the line L[4]. On the basis of this, the capture circuit 35b stores the unnecessary information ("—") in the start address SADR of the image data IMG2 after the line L[5]. (Details of Channel Composite Circuit)

Figures 11A, 11B:
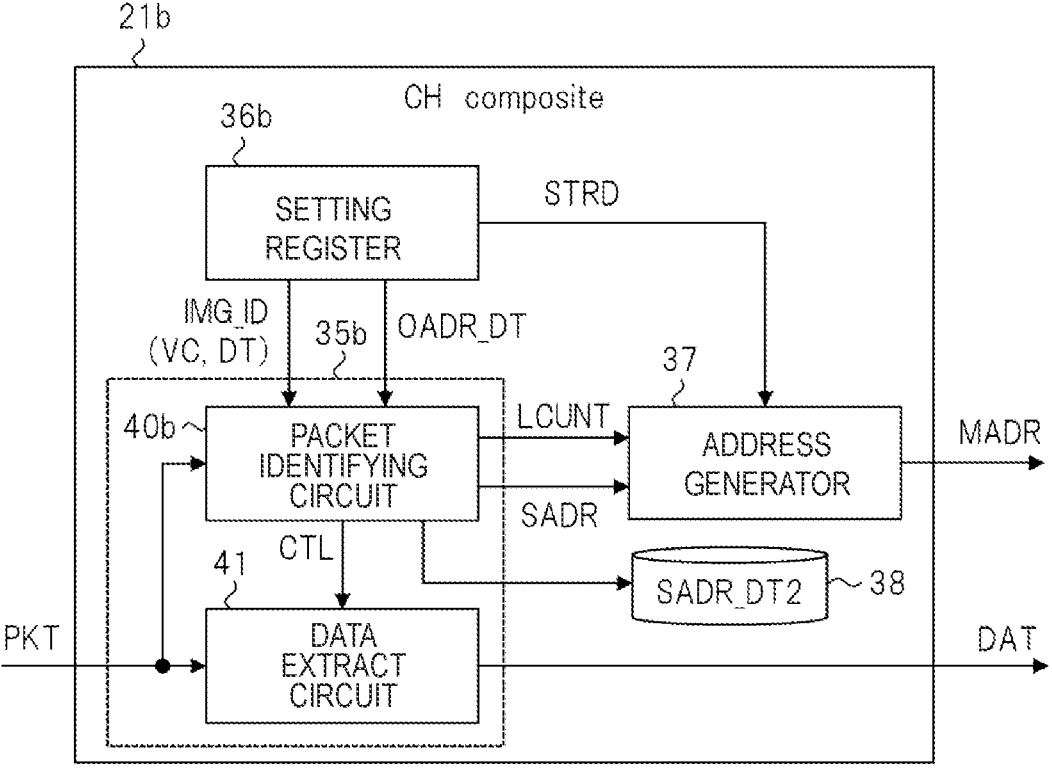
FIG. 11A is a block diagram illustrating a configuration of the channel composite circuit shown in FIG. 8.
FIG. 11B is a diagram illustrating an exemplary configuration of offset address data set in a setting register shown in FIG. 11A.

FIG. 11A is a circuit block showing a detailed configuration example of the channel composite circuit shown in FIG. 8, FIG. 11B is a diagram showing a configuration example of offset address data set in the setting register in the FIG. 11A. In the channel composite circuit 21b shown in the FIG. 11A, unlike in the FIG. 6A, the setting register 36b further comprises an offset address register. In the offset address register, as shown in the FIG. 11B, the line size W1-W3 of each of the three channels, the image data IMG1-IMG3, are set as the offset address data OADR_DT.

The capture circuit 35b includes a packet identifying circuit 40b and a data extract circuit 41. The data extract circuit 41 is the same as in FIG. 6A. The packet identifying circuit 40b generates the start address SADR and the start address data SADR_DT2 based on the inputted channel order and the offset address data OADR_DT, unlike in FIG. 6A. The start address SADR is outputted to the address generator 37 as in FIG. 6A. The start address data SADR_DT2 is stored in the storage area 38 which is a register or a memory. However, since the size of the start address data SADR_DT2 can be increased, the storage area 38 is preferably a memory.

FIG. 12 is a diagram showing a result of comparing various performances between the channel composite circuit shown in FIG. 8 and the channel composite circuit shown in FIG. 15. Again, as in the case of FIG. 7, they are compared in terms of circuit efficiency, bandwidth, standby power, and memory capacity. In FIG. 12, the content of the bandwidth is different from that in FIG. 7. That is, the technique of second embodiment is larger than the technique of the first embodiment in terms of the overhead associated with the notification of the start address data SADR_DT2.

Specifically, when the start address SADR is 32 bits (=4 bytes), the number of channels is M, and the number of lines in each channel is H, the size of the start address data SADR_DT2 is (M*H*4) bytes. On the other hand, as described in FIG. 7, if image data size of one camera is (1920*1080) bytes and the one camera has M channels, the size of the output data, for example, the image data is (M*1920*1080) bytes. Therefore, the size of the start address data SADR_DT2 is sufficiently small compared to the data size to be captured, and the overhead (a") of the bandwidth is also negligibly small. However, the overhead (a") illustrated in FIG. 12 is larger than the overhead (a') illustrated in FIG. 7.

As described above, by using the technique of the second embodiment, the same effects as those described in the first embodiment can be obtained even when a variable channel order is used for each line. Furthermore, since the channel order can be changed in this way, a mechanism for fixing the channel order is not necessary in the previous stage of the channel composite circuit, for example, in the interface circuit 20, the image sensor 11, or the like. As a result, the entire cost of the image processing system can be reduced.

Third Embodiment (Outline of Channel Composite Circuit)

FIG. 13 is a schematic diagram showing a schematic configuration example and an operation example of the channel composite circuit in FIG. 1 of an image processing system of the third embodiment. FIG. 14 is a schematic diagram illustrating a configuration example of map data generated by the channel composite circuit illustrated in FIG. 13. The channel composite circuit 21c shown in FIG. 13 includes a capture circuit 35c, a setting register 36c, and an address generator 37c, as in FIG. 8 and the like. However, the configurations and operations of these components are slightly different from those in the case of FIG. 8.

Specifically, unlike the case of FIG. 8, the channel composite circuit 21c is configured to cope with the case where the line data DAT is irregularly inputted without synchronizing the lines in all the channels in the image data IMG1-IMG3 of the three channels. For example, as shown in the memory map 30c in FIG. 13, the line data DAT is inputted in an irregular order, such as a line L[0] of the image data IMG1, a line L[0] of the image data IMG2, a line L[1] of the image data IMG1, and a line L[2] of the image data IMG1.

The channel composite circuit 21c writes the input line data DAT to the memory MEM in the input order. In this case, the channel composite circuit 21c, in particular the capture circuit 35c, increments the Y-count YCUNT and performs an address update based on YCUNT multiple of the line stride value STRD, in this example, at the stage when three line data are inputted. For this reason, the line stride value STRD is set to, for example, three times or more of the largest line size W1.

In addition, the capture circuit 35c generates map data MAP_DT as shown in FIG. 14 in response to inputting the irregular line data DAT. The map data MAP_DT indicates which Y line in Y lines Y[0]-Y[7] of the memory MEM is Y line start address for the line data DAT of the respective lines L[0]-L[8] of the image data IMG1-IMG3 and how much offset the line data DAT is stored with.

For example, the capture circuit 35c first stores the Y line Y[0] and the offset-value 0 in a corresponding area of the map data MAP_DT in order to write the line data DAT of the line L[0] of the image data IMG1 to the memory MEM. Subsequently, the capture circuit 35c stores, as a second step, the Y line Y[0] and the offset value W1, which is the first-written line size, in a corresponding area of the map data MAP_DT in order to write the line data DAT of the line L[0] of the image data IMG2 to the memory MEM.

Next, the capture circuit 35c stores, as a third, the Y line Y[0] and the offset value W1+W2, i.e., the sum of the first and second written line sizes, in a corresponding area of the map data MAP_DT in order to write the line data DAT of the line L[1] of the image data IMG1 to the memory MEM. Subsequently, the capture circuit 35c stores, as a fourth step, a Y line Y[1] associated with updating the Y count number YCUNT and an offset value of 0 in a corresponding area of the map data MAP_DT in order to write the line data DAT of the line L[2] of the image data IMG1 to the memory MEM.

The address generator 37c refers to the data stored in the map data MAP_DT and generates a memory address MADR for writing the line data DAT inputted to the capture circuit 35c to the memory MEM. The line data inputted to the capture circuit 35c is written to the memory MEM based on the memory address thus generated. Like the first and second embodiments, the ISP 22 or the image processor 24 can refer to the data stored in the map data MAP_DT to identify the memory address in which the image data IMG of the channel to be processed is stored.

Above, by using the technique of the third embodiment, even when the line data is input irregularly, the same effects as the various effects described in the first embodiment can be obtained. Further, since the line data may be input irregularly as described above, a mechanism for synchronizing the lines in all the channels is not necessary in the pre-stage portion of the channel composite circuit, for example, the interface circuit 20, the image sensor 11, and the like. As a result, the entire cost of the image processing system can be reduced.

Although the invention made by the present inventor has been specifically described based on the embodiment, the present invention is not limited to the embodiment described above, and it is needless to say that various modifications can be made without departing from the gist thereof.

What is claimed is:

1. A semiconductor device comprising:
an interface circuit configured to receive image data of a plurality of channels and configured to output a plurality of packets including the image data of the plurality of channels, the plurality of channels including a first channel and a second channel, image data of the first channel being first channel image data and image data of the second channel being second channel image data, and
a channel composite circuit configured to receive the plurality of packets and configured to transmit the image data of the plurality of channels included in the plurality of packets to a memory,
wherein the first channel image data and the second channel image data include a plurality of line data, respectively,
wherein the interface circuit is configured to output a first packet including a k-th line data of the first channel image data, to output a second packet including a k-th line data of the second channel image data and after outputting the first packet, and
wherein the channel composite circuit is configured to transmit the k-th line data of the first channel image data to the memory to store in a first address area, and to transmit the k-th line data of the second channel image data to the memory to store in a second address area following the first address area after the k-th line data of the first channel image data is stored in the memory.

2. The semiconductor device according to claim 1, wherein the plurality of packets have a format according to MIPI (Mobile Industry Processor Interface) CSI-2 (Camera Serial Interface 2) standard.

3. The semiconductor device according to claim 1, wherein the channel composite circuit includes a line stride register that stores a line stride value, the line stride value is larger than a total value of line sizes in the image data of the plurality of channels and is i times of BW, where i is an integer larger or equal to than 1 and BW is bus width of the memory, and where i is the smallest, and wherein the channel composite circuit is configured to write k-th line data of image data of the plurality of channels continuously from a line start address based on LCUNT times of the line stride value, where LCUNT is an integer, and write (k+1)-th line data of image data of the plurality of channels continuously from a line address based on (LCUNT+1) times of the line stride value.

4. The semiconductor device according to claim 3, wherein the interface circuit outputs the plurality of packets each including a line data in the image data of the plurality of channels in a predetermined channel order for each line, and wherein the channel composite circuit stores a start address for each channel for the line data in a storage area that is a register or a memory, the start address is a relative address from the line start address for each line and is determined based on the predetermined channel order.

5. The semiconductor device according to claim 3, wherein the interface circuit outputs the plurality of packets each including a line data in the image data of the plurality of channels in a variable channel order for each line, and wherein the channel composite circuit stores a start address for each channel and for each line for the line data in a storage area that is a register or a memory, the start address is a relative address from the line start address for each line and is determined by recognizing the variable channel order for each line.

6. The semiconductor device according to claim 2, wherein the channel composite circuit includes:

a packet identifying circuit provided in common to the image data of the plurality of channels and configured to identify a channel to which each of the plurality of packets belongs based on a header information of each packet, and a data extract circuit provided in common to the image data of the plurality of channels and configured to extract the line data included in each packet.

7. The semiconductor device according to claim 6, wherein the header information includes a virtual channel value and a data type value, and wherein the packet identifying circuit configured to identify the channel to which each of the plurality of packet belongs based on a combination of the virtual channel value and the data type value.

8. An image processing system comprising:

an image sensor configured to capture image of an object and generates image data of a plurality of channels, the plurality of channels including a first channel and a second channel;

a memory storing the image data of the plurality of channels;

an interface circuit configured to receive the image data of the plurality of channels and configured to output a plurality of packet including the image data of the plurality of channels;

a channel composite circuit configured to receive the plurality of packets and configured to write the image data of the plurality of channels included in the plurality of packets into the memory; and an image signal processor (ISP) configured to perform a demosaicing processing for the image data of the plurality of channel stored in the memory or transmitted from the channel composite circuit, wherein the image data of the plurality of channels includes a plurality of line data, respectively, wherein the interface circuit is configured to output a first packet including a k-th line data included in an image data of the first channel, to output a second packet including a k-th line data included in an image data of the second channel after outputting the first packet, wherein the channel composite circuit is configured to transmit the k-th line data included in the image data of the first channel to the memory to store in a first address area and to transmit the k-th line data included in the image data of the second channel to the memory to store in a second address area following the first address area after the k-th line data included in the image data of the first channel is stored in the memory.

9. The image processing system according to claim 8, further comprising:

an image processor configured to perform an image recognition processing for image data stored in the memory after image processing by the ISP or the image data of the plurality of channels stored in the memory by the channel composite circuit.

10. The image processing system according to claim 8, wherein the plurality of packets have a format according to MIPI (Mobile Industry Processor Interface) CSI-2 (Camera Serial Interface 2) standard.

11. The image processing system according to claim 9, wherein the channel composite circuit includes a line stride register that stores a line stride value, the line stride value is larger than a total value of line sizes in the image data of the plurality of channels and is i times of BW, where i is an integer larger or equal to than 1 and BW is bus width of the memory, and where i is the smallest, and wherein the channel composite circuit is configured to write k-th line data of image data of the plurality of channels continuously from a line start address based on LCUNT times of the line stride value, where LCUNT is an integer, and write (k+1)-th line data of image data of the plurality of channels continuously from a line address based on (LCUNT+1) times of the line stride value.

12. The image processing system according to claim 11, wherein the interface circuit outputs the plurality of packets each including line data in the image data of the plurality of channels in a predetermined channel order for each line, wherein the channel composite circuit stores a start address for each channel for the line data in a storage area that is a register or a memory, the start address is a relative address from the line start address for each line and is determined based on the predetermined channel order, and wherein the ISP or the image processor is configured to read the image data of the plurality of channels by referring the start address when the ISP or the image processor performs processing for the image data of the plurality of channels stored in the memory.

13. The image processing system according to claim 11, wherein the interface circuit outputs the plurality of packets each including line data in the image data of the plurality of channels in a variable channel order for each line, wherein the channel composite circuit stores a start address for each channel and for each line for the line data in a storage area that is a register or a memory, the start address is a relative address from the line start address for each line and is determined by recognizing the variable channel order for each line, and wherein the ISP or the image processor is configured to read the image data of the plurality of channels by referring the start address when the ISP or the image processor performs processing for the image data of the plurality of channels stored in the memory.

14. The image processing system according to claim 10, wherein the channel composite circuit includes:

a packet identifying circuit provided in common to the image data of the plurality of channels and configured to identify a channel to which each of the plurality of packets belongs based on a header information of each packet, and a data extract circuit provided in common to the image data of the plurality of channels and configured to extract the line data included in each packet.

15. The image processing system according to claim 14, wherein the header information includes a virtual channel value and a data type value, and wherein the packet identifying circuit configured to identify the channel to which each of the plurality of packet belongs based on a combination of the virtual channel value and the data type value.

* * * * *